United States Patent
Ferrari et al.

(10) Patent No.: US 6,929,442 B2
(45) Date of Patent: Aug. 16, 2005

(54) LIFTING UNIT FOR TIRE VEHICLE WHEELS

(75) Inventors: Gino Ferrari, Correggio (IT); Franco Maioli, Correggio (IT)

(73) Assignee: Femas S.r.l., Correggio (IT)

( * ) Notice: Subject to any disclaimer, the term of this patent is extended or adjusted under 35 U.S.C. 154(b) by 68 days.

(21) Appl. No.: 10/121,028

(22) Filed: Apr. 11, 2002

(65) Prior Publication Data

US 2002/0164238 A1 Nov. 7, 2002

Related U.S. Application Data

(63) Continuation-in-part of application No. 09/517,781, filed on Mar. 2, 2000, now abandoned.

(30) Foreign Application Priority Data

Oct. 3, 1999 (IT) .................................. MO99A000041

(51) Int. Cl.[7] .................................................. B66F 3/24
(52) U.S. Cl. ...................................................... 414/426
(58) Field of Search ................................. 414/426, 483; 700/230; 73/487

(56) References Cited

U.S. PATENT DOCUMENTS

| 4,060,170 A | | 11/1977 | Walters | |
|---|---|---|---|---|
| 4,664,584 A | * | 5/1987 | Braun et al. ................. | 414/541 |
| 4,684,310 A | | 8/1987 | Stange | |
| 5,161,931 A | | 11/1992 | Mayer | |
| 5,244,331 A | | 9/1993 | Rühl | |
| 5,344,089 A | * | 9/1994 | Crowley et al. ............. | 242/417 |
| 5,490,756 A | | 2/1996 | Reichert et al. | |
| 5,821,416 A | * | 10/1998 | Hjort-Hansen ................ | 73/487 |
| 6,173,213 B1 | * | 1/2001 | Amiguet et al. ............ | 700/230 |
| 6,289,962 B1 | * | 9/2001 | Klein ......................... | 157/1.17 |
| 6,588,478 B2 | * | 7/2003 | Vignoli ....................... | 157/1.28 |

FOREIGN PATENT DOCUMENTS

| DE | 4125809 A1 | 2/1993 |
|---|---|---|
| DE | 19741751 A1 | 3/1999 |
| EP | 0 848 238 A2 | 6/1998 |

* cited by examiner

*Primary Examiner*—Eileen D. Lillis
*Assistant Examiner*—Charles A. Fox
(74) *Attorney, Agent, or Firm*—Wolf, Greenfield & Sacks, PC

(57) ABSTRACT

A lifting unit for a vehicle wheel designed to cooperate with a tire changing machine and a balancing machine arranged on opposite sides thereof and located at a respective operating level, said lifting unit comprising at least one support frame, guide means vertically extending from said support frame, a cross-member guide slidingly mounted on said guide means and arranged to be moved up and down thereon, driving means carried by said support frame and arranged to move said cross-member guide on said guide means, a bracket means slidingly supported on said cross-member guide and designed to carry a vehicle wheel to be processed, a limiting means slidably carried on a vertical guide means, supported by said support frame, and arranged to engage with said guide means to act upon said driving means, wheel detecting means carried by said support frame and arranged to detect the diameter of a wheel standing on said bracket means, and control means arranged to position said limiting means depending upon the diameter of a vehicle wheel as detected by said wheel detecting means.

4 Claims, 5 Drawing Sheets

US 6,929,442 B2

LIFTING UNIT FOR TIRE VEHICLE WHEELS

This is continuation-in-part of Application Ser. No. 09/517,781, filed Mar. 2, 2000 now abandoned, now pending, the disclosure of which is expressly incorporated herein by reference.

BACKGROUND OF THE INVENTION

The present invention relates to a lifting unit for vehicle wheels.

During the fitting and removal of tires onto and from wheels and during an ensuing balancing operation that the worn wheel has to undergo, workers in this field are repeatedly required to lift and lower very heavy wheels, particularly when dealing with industrial vehicles.

More particularly, the most energy-consuming operations are removal of a tire-fitted wheel from the platform of a tire changing machine, transfer of the wheel onto the flanged shaft of a balancing machine, and its subsequent transfer to the vehicle hub for refitting.

Such operations are often carried out at different levels from the ground. This cycle of operations is to be repeated for each wheel to be processed, and thus the overall effort required in a working day is normally considerable.

Moreover, statutory provisions on conditions at the workplace have acknowledged this problem and set a limit to the maximum weight that each operator is required to lift when carrying out the above wheel treating operations.

To comply also with these statutory provisions and meet the increasingly widespread requirements regarding lightening of the physical effort the operators have to endure, various kinds of wheel lifting units have been devised which allow a considerable reduction in overall human energy expenditure to be obtained, thus avoiding manual lifting or transferring of the wheels from one machine to another.

Conventional lifting units essentially comprise a base frame which might be provided with wheels for its movement on the ground, and a turret carried by the base frame along which two overhanging arms can slide so as to converge towards one another or diverge. Such arms are actuated in various ways and provided with clamping elements which are suitable for picking up a wheel from the ground and suitably positioning it on these machines. The movements of the arms are such that the wheels are clamped and at the same time their axes are aligned with the main shaft of a balancing machine onto which the wheel is to be fitted.

When suitably provided with wheels, a lifting unit can also be used for transferring and positioning a worn and balanced wheel onto a respective hub of the vehicle on which it is to be fitted.

SUMMARY OF THE INVENTION

An object of the present invention is to solve and overcome the above problems of the prior art by providing a lifting unit for worn vehicle wheels, which allows all the most energy-demanding operations for lifting and transferring the wheels to and from machines to be carried out in an essentially automatic way, thereby minimizing the physical efforts to be made by the operator.

Another object of the present invention is to provide a lifting unit which makes it possible to automatically and precisely align the centre of a vehicle wheel with the hub of a balancing machine adjacent to it with no need for additional aligning of the axis or adjusting the height of the wheel.

These and other objects that better appear hereinbelow are attained by a lifting unit for a vehicle wheel designed to cooperate with a tire changing machine and a balancing machine arranged on opposite sides thereof and located at a respective operating level, said lifting unit comprising:

a support frame;

guide means vertically extending from said frame member 3;

a cross-member guide slidingly mounted on said guide means and arranged to be moved up and down thereon;

driving means carried by said support frame and arranged to move said cross-member guide on said guide means;

a bracket means slidingly supported on said cross-member guide and designed to carry a vehicle wheel to be processed;

a limiting means slidably carried on a vertical guide means, supported by said supporting frame, and arranged to engage with said guide means to act upon said driving means;

wheel detecting means carried by said frame and arranged to detect the diameter of a wheel standing on said bracket means; and control means arranged to position said limiting means depending upon the diameter of said vehicle wheel as detected by said wheel detecting means.

BRIEF DESCRIPTION OF THE DRAWINGS

Further features and advantages of the present invention will become better apparent from the following detailed description of a preferred embodiment of a lifting unit for vehicle wheels, illustrated only by way of non-limiting example in the accompanying drawings, in which.

DETAILED DESCRIPTION

Figure 2:
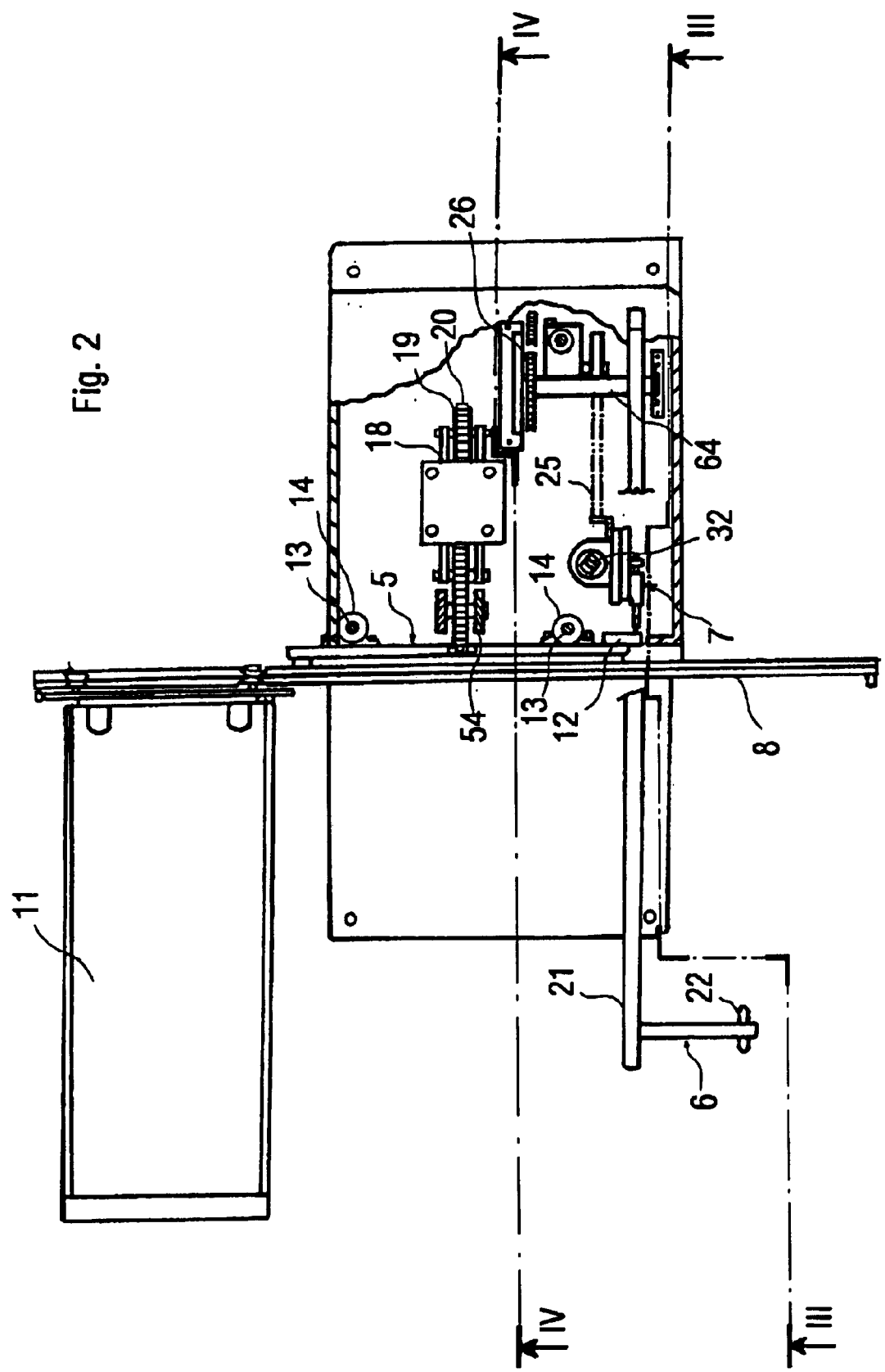
FIG. 2 is a plan view of the lifting unit of FIG. 1.

With reference to the above Figures, reference numeral 1 generally designates a lifting unit for vehicle wheels 2, which comprises a frame 3 that supports lifting means 4, such as a lifting bracket or platform, with two degrees of freedom, i.e. for lifting and lowering the wheels 2, and transmission means 5, better visible in FIG. 2, for horizontally transferring wheels 2 towards or away from lateral machinery (not shown in the drawings). The lifting means 4, described in greater detail hereinafter, are supported by a cross-member guide 8, e.g., a metal plate or bar, controlled by the transmission means 5.

A detector 6 is arranged to co-operate with limiting means 7 designed to control the downward movement of the lifting means 4.

Limiting means 7 preferably includes a slider 32 which is slidably fitted onto a guide 33 rigidly supported by frame 3 so that it can slide in a substantially vertical direction. Vertical guide 33 is preferably polygonal in cross-section to prevent the slider 32 from rotating. The slider 32 supports the limiting element 7 which includes a microswitch 70 and a projecting probe arrangement 34 designed to engage with a detent element 12, e.g., a cam, carried by cross-member guide 8, as further explained below, to actuate the microswitch 70.

The transmission means 5 comprise a pair of sleeves 14 slidingly mounted on two substantially vertical and parallel guide bars 13 (FIG. 2). Vertical movement of the sleeves 14 is caused by a driving group, preferably including a cylinder and piston unit 9, carried by frame 3.

Bracket or platform 11 is slidably supported by the cross-member guide 8 through a plurality of upper and lower rollers or slides 81 in such a way that bracket 11 is free to slide horizontally, e.g., through a simple and effortless pushing action.

On its upper surface, bracket 11 preferably supports wheel retaining means 15, e.g., a cradle.

Sleeves 14 are vertically moved along their respective guides 13 by a linear actuator, such as a cylinder and piston unit 9 having, e.g., its cylinder 91 secured to the frame 3 and its piston rod 92 fixed to a carriage structure 18 carrying one or two chain wheels 19 engaging with a chain 20. Chain 20 has one end fixed to the frame 3 at fixation point 250 and its other end secured to cross-member guide 8, and is wound and guided around a snub pulley 54 carried by frame 3.

According to a first embodiment of the present invention, piston rod 92 and chain 20 have such lengths that when piston rod 92 is fully extended, cross-member guide 8 and bracket 11 have slid upwards to such an extent that bracket 11 is located at the same level as a rotating platform of a tire changing machine (not shown) located adjacent to the lifting unit 1.

The detector 6 for detecting the diameter of wheels 2 comprises an arm 21 arranged for pivotal movement about a horizontal pivot pin 64 on a substantially vertical plane. Arm 21 extends above the lifting means 4 and transmission means 5 and at its free distal end is provided with a feeler 22 that is designed to sense the tread of the tire of a wheel 2. At its other end, arm 21 is rigid in rotation with a chain wheel 26 which is keyed onto pivot 64 of arm 21. Chain wheel 26 transmits the angular rotation of arm 21 from a reference position, e.g., normal to the ground, to a contact position of feeler 22 when brought into contact with a tire 2. Such an angular motion is transmitted to a transmission means, e.g., an endless chain 24 or a positive drive belt wound onto chain wheels 26, and a pair of roller chain wheels 29 and a chain wheel 30 located between chain wheel 26 and a chain wheel 29.

Chain wheels 29 are idly supported on a fixed bracket 28. Chain wheel 30 is rigid in rotation with a lifting arm 31 pivotally supported on frame 3 so as to pivot on a substantially vertical plane through an angle of rotation that is proportional to, e.g., double, the angle of rotation of chain wheel 26, the ratio between angles of rotation of chain wheels 26 and 30 depending upon the ratio between their respective number of teeth.

One end 311 of arm 31 is connected to limiting element 7 by means of chain or cable 25 and thus limiting element 7 can be set in vertical position correlated to the diameter of the wheel 2 to be treated.

Figure 5:
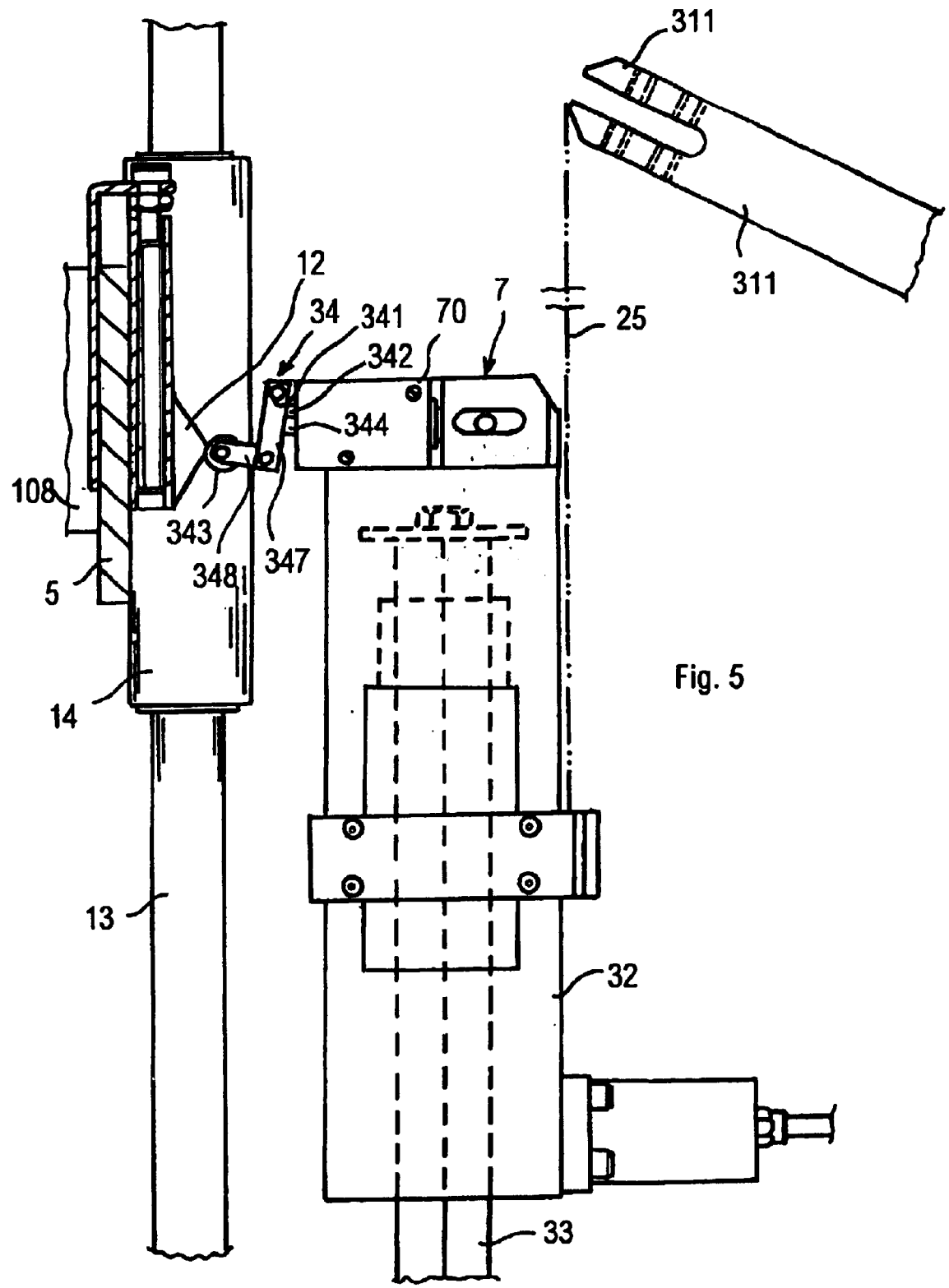
FIG. 5 shows a detail of FIG. 1 on an enlarged scale.

According to a specific embodiment of the present invention, probe arrangement 34 is substantially L-shaped and comprises a lever 347 pivoted to the limiting element 7 at its upper end 341 and cross-portion 348 pivoted to lever 347 and projecting from it towards detent element 12. The cross portion 348 carries a cam follower roller 343. Two resilient means 342 and 344, e.g., helical springs, are provided between the limiting element 7 and the lever 347 and cross-portion 348 and thus when probe arrangement 34 is moved downwards with respect to cam 12, cross-portion 348 is urged to pivot rightwise (when looking at FIG. 5) and microswitch 70 is not actuated, whereas when it is moved upwards, cross-portion 348 angularly rotates towards lever 347 and actuates microswitch 70. Thus, upwards movements of probe arrangement 34 or lowering of sleeves 14 with respect to probe arrangement 34 have no effect on microswitch 70, and sleeves 14 and bracket 11 can slide on vertical guide means 13 and move so far as the upper end of the stroke of the actuating piston and cylinder unit 91, at the level of a first machine, e.g., a tire changing machine.

When sleeves 14 move downward (by gravity), roller 343 engages with the upper surface of cam 12, causing cross-portion 348 to swivel downwards, thereby actuating microswitch 70 that stops unit 91 and thus the descent of sleeves 14 and bracket 11 at the level of a second machine, e.g., a balancing machine.

According to another embodiment of the present invention, the probe arrangement 34 is provided with a microswitch 70 that is changed over both when sleeves 14 are moved upwards and downwards with respect to probe arrangement 34.

The lifting unit according to the present invention operates as follows. Lifting unit 1 is positioned between two worn wheel working machines such as a tire changing machine and a wheel balancing machine.

While bracket 11 rests on the ground, a wheel 2 to be processed is placed on it standing in a vertical position on cradle 15.

Figure 1:
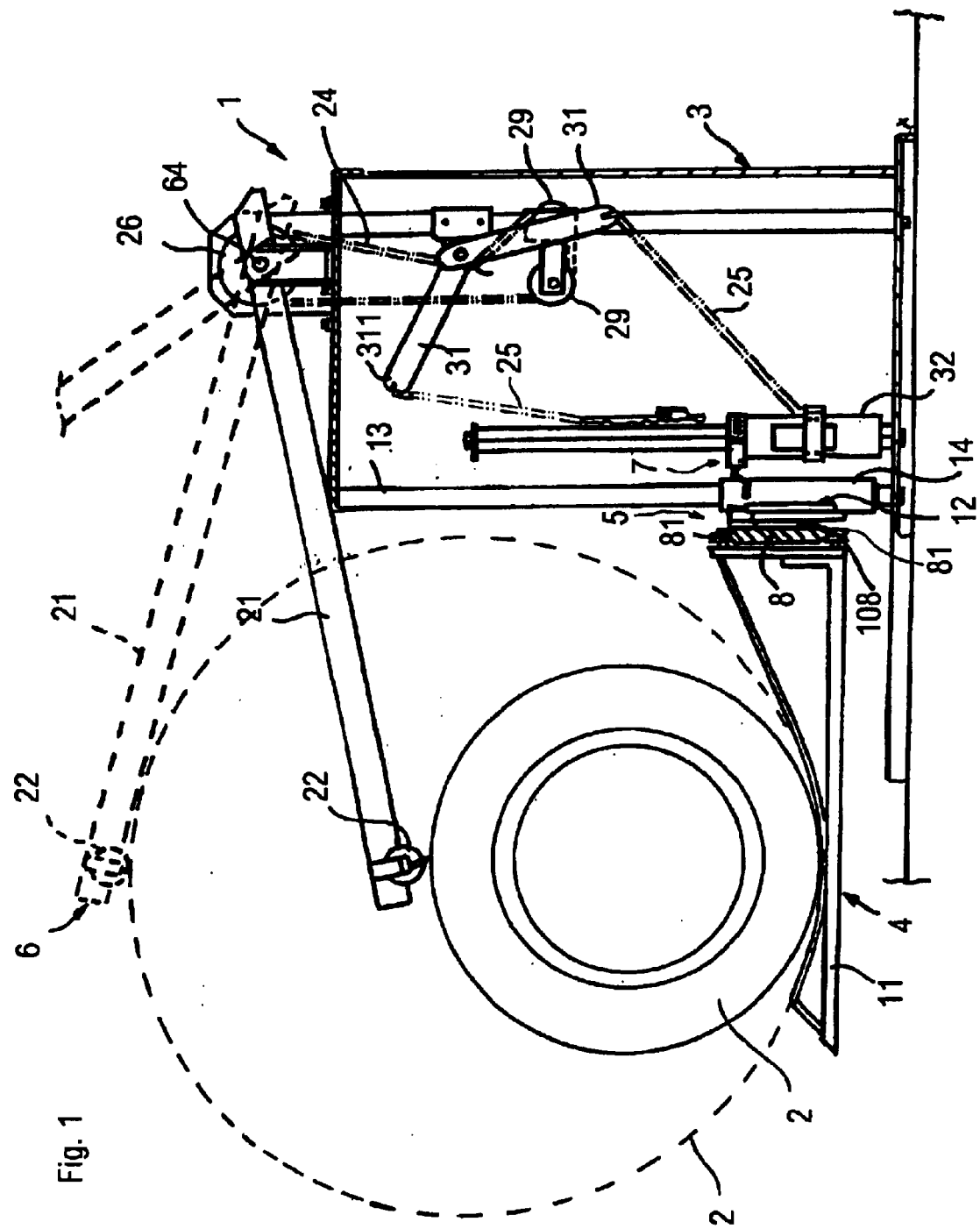
FIG. 1 is a diagrammatic side view of the lifting unit for vehicle wheels according to the present invention.

At this stage the operator pulls down arm 21 from its reference position causing it to rotate about pivot 64 until contact with the highest point of wheel 2 is reached (FIG. 1). Partial rotation of arm 21 results in chain wheel 26 being rotated, which in turn drives arm 31. Arm 31, by pulling chain or cable 25, correspondingly lifts slider 32 and thus microswitch 70 and probe arrangement 34 so as to preset limiting element 7 to a level which depends on the diameter of the wheel on bracket 11.

Figure 3:
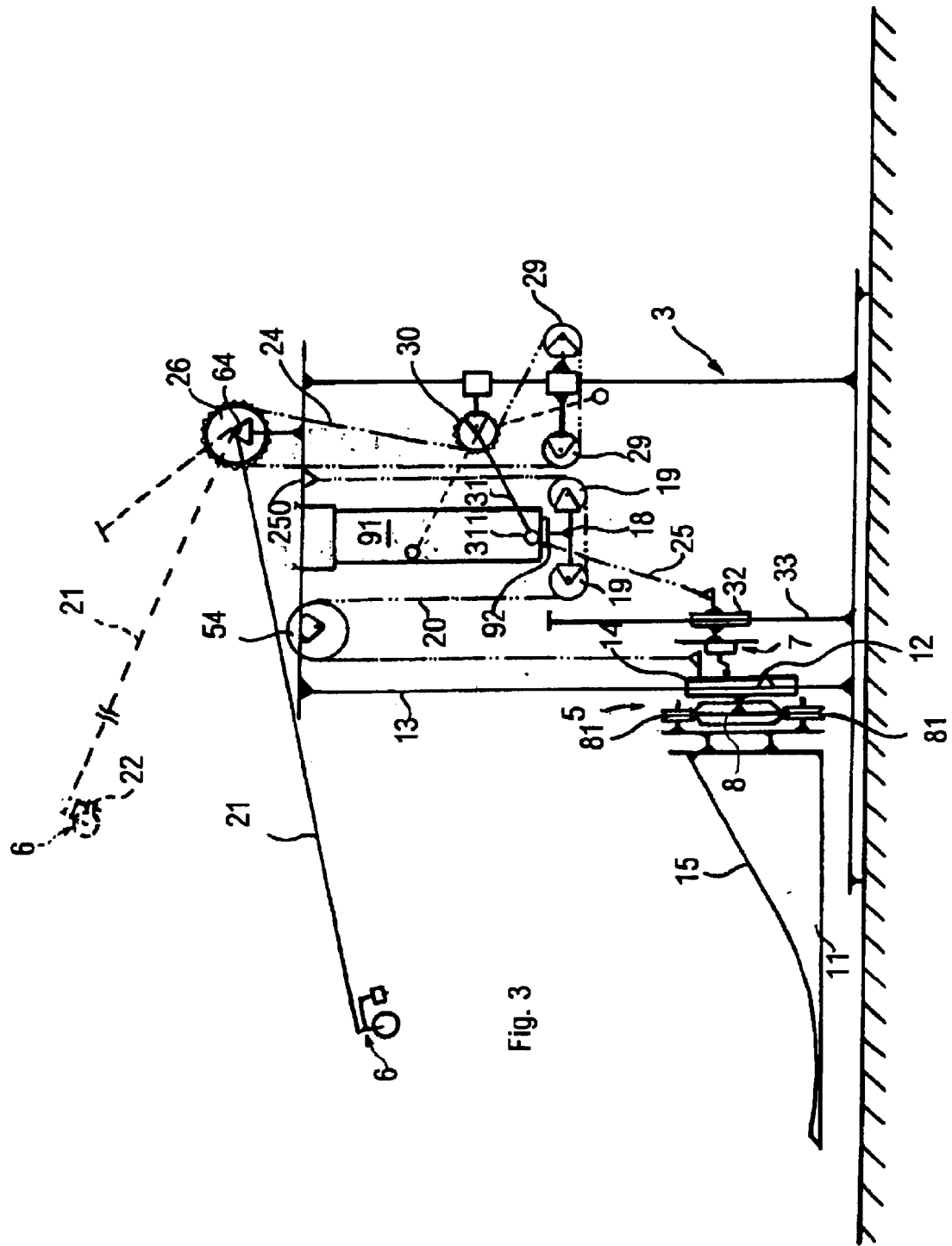
FIG. 3 is a diagrammatic elevation side view taken along line III—III of FIG. 2.
Figure 4:
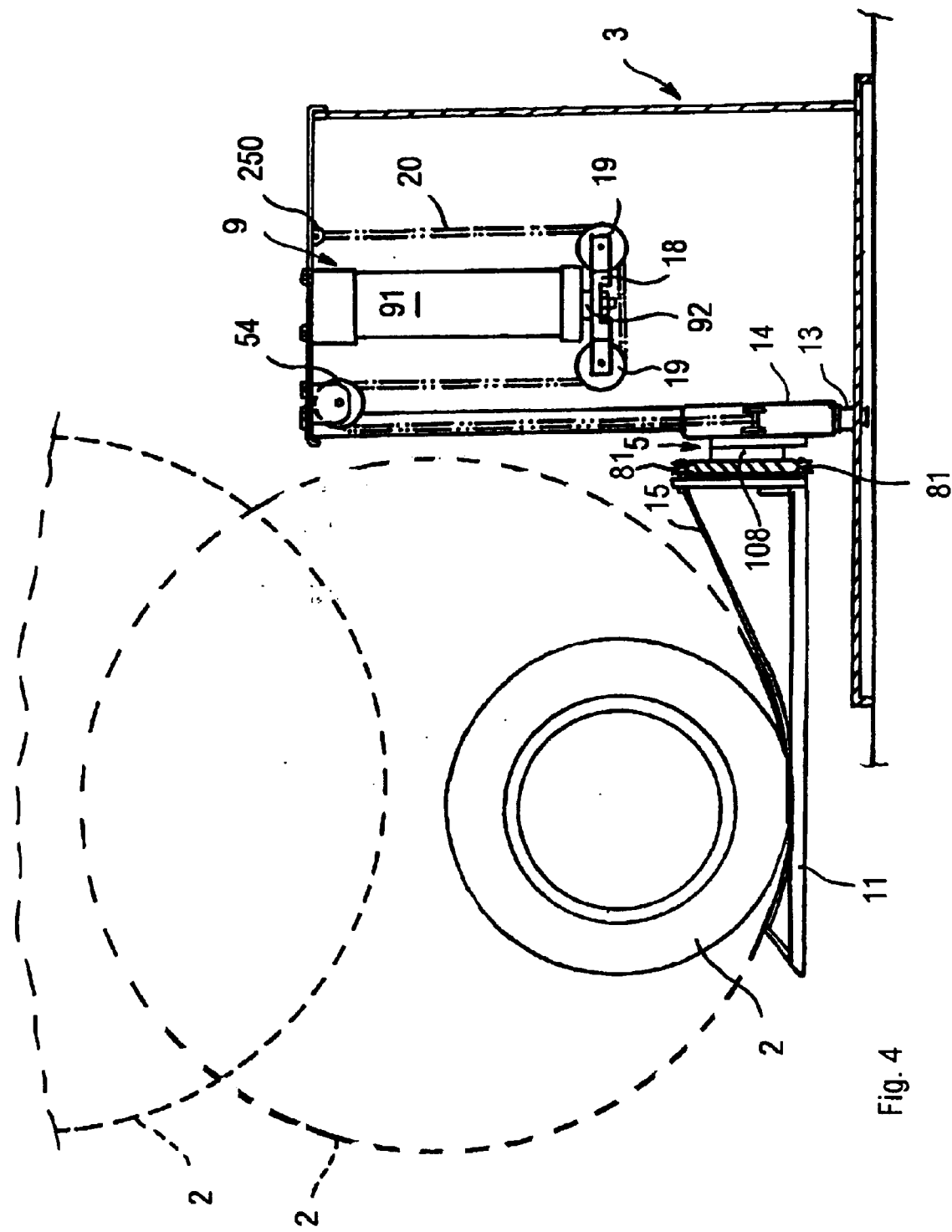
FIG. 4 is a diagrammatic elevation side view taken along line IV—IV of FIG. 2.

Transmission ratio between the sprockets 26 and 30 is preferably 2:1. By acting on a control, e.g., a press button (not shown in the drawings), the operator energises the cylinder and piston unit 9, which while extending pushes down carriage 18 (FIG. 3). Chain 20 thus lifts cross-member guide 8, bracket 11, and wheel 2 until it reaches the higher level at which the rotating working platform of the tire changing machine is arranged.

The operator then manually pushes bracket 11 along the horizontal cross-member guide 8, thereby feeding the wheel 2 to the working platform without exerting any lifting force. The wheel 2 is then transferred onto the working platform of the changing machine, where the tire is removed and a new one fitted on.

After such tire processing operations have been accomplished, the operator loads wheel 2 back onto bracket 11, which is then pushed along the cross-member guide 8, and then actuates the hydraulic cylinder and piston unit 9, which retracts together with carriage 18, whereby causing bracket 11 and cross-bar guide 8 to descend along guides 13 until detent element 12 engages with roller 343 to actuate switch 70. Downward movement of sleeves 14 along vertical guides 13 is thus stopped at a level at which wheel 2 has its horizontal axis of rotation aligned with the main rotating shaft of the adjacent balancing machine.

The operator pushes bracket 11, causing it to slide along cross-member element 8, and inserts wheel 2 onto the rotating shaft of the balancing machine for balancing the wheel.

Once balancing operation has been completed, wheel 2 is removed from the shaft of the balancing machine and returned to the bracket 11, which is then moved back to lifting unit 1 and lowered to ground level ready for being unloaded.

The invention thus conceived is susceptible to numerous modifications and variations within the scope of the claims.

What is claimed is:

1. A lifting unit for a vehicle wheel designed to cooperate with a tire changing machine and a balancing machine arranged on opposite sides thereof and located at a respective operating level, said lifting unit comprising:
   a support frame;
   guide means vertically extending from said support frame;
   a cross-member guide slidingly mounted on said guide means and arranged to be moved up and down thereon;
   driving means carried by said support frame and arranged to move said cross-member guide on said guide means;
   a bracket means slidingly supported on said cross-member guide and designed to carry a vehicle wheel to be processed;
   a limiting means slidably carried on a vertical guide means, supported by said support frame, and arranged to engage with said guide means to act upon said driving means;
   wheel detecting means carried by said support frame and arranged to detect the diameter of a wheel standing on said bracket means; and
   control means arranged to position said limiting means depending upon the diameter of a vehicle wheel as detected by said wheel detecting means, wherein said wheel detecting means comprises a lever member pivoted to said support frame, sensing means carried by said lever member and designed to contact from above a wheel standing on said bracket means when said lever member is pivoted to a working position, and motion transmission means located between said lever member and said limiting means and arranged to swivel between a resting position and a working position.

2. A lifting unit as claimed in claim 1, wherein said motion transmission means comprises a first chain wheel rigid in rotation with said lever member, endless chain or belt wound on said first chain wheel, a second chain wheel in engagement with said endless chain, an arm member having one end thereof rigid in rotation with said second chain wheel and a free end, and a cable or chain having one end secured to said free end of said arm member and the other end secured to said limiting means.

3. A lifting unit for a vehicle wheel designed to cooperate with a tire changing machine and a balancing machine arranged on opposite sides thereof and located at a respective operating level, said lifting unit comprising:
   a support frame;
   guide means vertically extending from said support frame;
   a cross-member guide slidingly mounted on said guide means and arranged to be moved up and down thereon;
   driving means carried by said support frame and arranged to move said cross-member guide on said guide means;
   a bracket means slidingly supported on said cross-member guide and designed to carry a vehicle wheel to be processed;
   a limiting means slidably carried on a vertical guide means, supported by said support frame, and arranged to engage with said guide means to act upon said driving means;
   wheel detecting means carried by said support frame and arranged to detect the diameter of a wheel standing on said bracket means; and
   control means arranged to position said limiting means depending upon the diameter of a vehicle wheel as detected by said wheel detecting means, wherein said limiting means comprises a fixed guide member vertically extending from said support frame, a slider member slidably mounted on said fixed guide members, a limit switch carried by said slider member, and a probe means designed to actuate said limit switch upon engagement with said cross-member guide to act upon said driving means.

4. A lifting unit as claimed in claim 3, wherein said probe means comprises a lever means having one end pivoted to said limit switch or said slider member and its other end linked to a cross-member extending transversely to said lever means, and a cam follower means carried by said cross-member and arranged to be engaged by said cross-member guide to actuate said limit switch.

* * * * *